United States Patent [19]

Jones

[11] 4,364,182

[45] Dec. 21, 1982

[54] LATIN SQUARE THREE DIMENSIONAL GAGE MASTER

[75] Inventor: Lynn L. Jones, Lexena, Kans.

[73] Assignee: The United States of America as represented by the United States Department of Energy, Washington, D.C.

[21] Appl. No.: 262,846

[22] Filed: May 12, 1981

[51] Int. Cl.³ .................... G01B 7/03; G01C 25/00
[52] U.S. Cl. ...................... 33/174 H; 33/174 PC; 73/1 J
[58] Field of Search .............. 33/174 R, 174 H, 174 J, 33/174 L, 174 PC, 180 R, 181 R; 73/1 J

[56] References Cited

U.S. PATENT DOCUMENTS

| | | | |
|---|---|---|---|
| 3,403,448 | 10/1968 | Aller | 33/174 R |
| 3,908,278 | 9/1975 | Sundahl | 73/1 J |
| 4,168,576 | 9/1979 | McMurtry | 33/174 PC |

FOREIGN PATENT DOCUMENTS 1334398 10/1973 United Kingdom .......... 33/174 PC

OTHER PUBLICATIONS

Barr, John R., "Coordinate Measuring Machine Calibration", *Quality*, Mar. 1979, pp. 18 & 19.
Hocken, Robert J., "Report of Calibration", National Bureau of Standards Doc. No. M0720, Apr. 1980.

*Primary Examiner*—Richard R. Stearns
*Attorney, Agent, or Firm*—Armand McMillan; George H. Libman; Richard G. Besha

[57] ABSTRACT

A gage master for coordinate measuring machines has an nxn array of objects distributed in the Z coordinate utilizing the concept of a Latin square experimental design. Using analysis of variance techniques, the invention may be used to identify sources of error in machine geometry and quantify machine accuracy.

8 Claims, 3 Drawing Figures

| | | | | |
|---|---|---|---|---|
| $Y_4$ | $Z_2$ | $Z_3$ | $Z_1$ | $Z_4$ |
| $Y_3$ | $Z_3$ | $Z_2$ | $Z_4$ | $Z_1$ |
| $Y_2$ | $Z_4$ | $Z_1$ | $Z_3$ | $Z_2$ |
| $Y_1$ | $Z_1$ | $Z_4$ | $Z_2$ | $Z_3$ |
| | $X_1$ | $X_2$ | $X_3$ | $X_4$ |

$X_i$ — DENOTES DISTANCE ALONG THE X-AXIS (i=1, 2, 3, 4)

$Y_j$ — DENOTES DISTANCE ALONG THE Y-AXIS (j=1, 2, 3, 4)

$Z_k$ — DENOTES DISTANCE ALONG THE Z-AXIS (k=1, 2, 3, 4)

Fig. 2 TWO DIMENSIONAL REPRESENTATION OF A LATIN SQUARE 3D GAGE MASTER (N=4)

LATIN SQUARE THREE DIMENSIONAL GAGE MASTER

The United States Government has rights in this invention pursuant to Contract No. DE-AC04-DP00613 between the U.S. Department of Energy and The Bendix Corporation.

BACKGROUND OF THE INVENTION

The present invention relates generally to the calibration of coordinate measuring machines and more particularly to a gage utilizing objects arranged in a Latin square pattern.

The coordinate measuring machine (CMM) is a device for accurately determining the spatial relationship between two points in space. Each CMM incorporates probing components utilized to interface with the object being measured, which object is restrained on a support table. CMMs may be constructed according to one of the following classifications:

CANTILEVER (FIG. 1)—A measuring device employing three mechanical components moving along mutually perpendicular axes. Probing device 17 is attached to the component 18 with motion in the vertical direction, which in turn is attached to the first of the two horizontal components. The first 19 is fixed to the second 20 at one end 21 only, in cantilever fashion, over the support table 22.

BRIDGE—A measuring device employing three mechanical components moving along mutually perpendicular axes. The probing device is attached to the component with motion in the vertical direction, which in turn is attached to the first of the two horizontal components. The first is attached to the second at two locations forming a bridge over the support table.

COLUMN—A measuring device employing one mechanical component moving in the vertical direction to which the probing device is attached. The support table is movable in two mutually perpendicular horizontal directions.

HORIZONTAL ARM—A measuring device employing three mechanical components moving along mutually perpendicular axes. The probing device is attached to the first component movable in the horizontal direction. This component is attached to the vertical component in cantilever fashion over the support table. The vertical component is attached to the second horizontal component.

GANTRY—A measuring device employing three mechanical components moving along mutually perpendicular axes. The probing device is attached to the component moving in the vertical direction, which in turn is attached to the first horizontal component. The first component is attached to the second horizontal in two locations bridging the support table (support jacks) in a location elevated above the support table.

OTHER—Any machine utilizing axis configuration different than stated in the above categories.

The CMM is used to measure items at state of the art accuracy, i.e., tens of microinches. For these measurements to be useful the measurement capability of the CMM must be known, as a product should be accepted or rejected on the basis of its dimensions, not on the CMM's measurement error.

Measurement capability (accuracy) of a coordinate measuring machine is characterized by precision and systematic error (bias) as determined relative to a given calibrated fixture. Precision, the random (inherent) error in the measurement process of a CMM, is the inability of the measurement process of a CMM to obtain the same values (X and/or Y and/or Z) when the same point is measured more than once. The magnitude of this error may vary from one location to another within the working space of a CMM.

Systematic error (bias) is the difference between the true value of a characteristic and the average of repeated measurements on that characteristic. For a CMM, this error may be caused by error in machine geometry. Systematic error is measured by the variation introduced into the measurement process by movement along the X axis, movement along the Y axis and movement along the Z axis. This movement along the axis may contribute bias and/or random error to the measurement process. Other factors which may contribute to systematic error are environments, operators and set ups.

Knowledge of the above information provides the user of a CMM with a quantitative measure of the CMM's measurement capability. This knowledge provides a basis for determining if a CMM has the necessary accuracy to measure a product and if the decision regarding the acceptability of the product has a high probability of being correct.

There are two popular ways to evaluate accuracy and precision of a CMM. The traditional technique is to make parametric tests of the 21 sources (yaw, pitch, roll, etc.) of error that introduce inaccuracy into the measurement process. Each test is made by moving the probe along a calibrated device and comparing the measurement with the known configuration of the device. A new technique involves the use of a gage master with a plurality of gage points fixed in a plane or space, when the CMM probe is moved from point to point and the measured distance between points is compared with the known distance.

A problem with these techniques is that their measurements give an indication of the accuracy of a CMM for a limited range of measured points. The range of axis movement is limited because of the configuration and dimensions of these devices. To increase the range of axis movement over which accuracy statements would apply requires multiple movements of these devices. This movement not only introduces a non-estimable source of variation into the evaluation process but also reduces productivity by requiring additional time on the CMM.

SUMMARY OF THE INVENTION

It is an object of the invention to provide a Latin square gage master that may be used to determine the measurement capability of a CMM.

It is another object of this invention to provide a Latin square gage master that may be used to identify the sources of error in a CMM.

It is a further object of this invention to provide a Latin square gage master that enables calibration of a CMM with only one placement of the gage master.

It is also an object of this invention to provide a gage master having an nxn array of gage points whose elevations are arranged according to a Latin square.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the gage master of this invention may comprise $n^2$ substantially identical object means, where n is an integer $\geq 3$, and mounting means for rigidly fastening each object means relative to the other object means to define $n^2$ points in space. Each point is located at a coordinate $X_{iA}$, $Y_{jB}$, $Z_{kC}$, where A, B and C are units of distance and i and j are variables (0, 1, . . . , (n−1)). In addition, for each row $X_{iA}$ and each column $Y_{jB}$, k equals each member of the set 0, 1, 2, . . . , (n−1), forming an nxn Latin square according to the Z dimensions of the object means.

In a preferred embodiment, $A=B$, $n=4$ and the object means are tooling balls having the following values of k:

3, 0, 2, 1
0, 3, 1, 2
1, 2, 0, 3
2, 1, 3, 0

BRIEF DESCRIPTION OF THE DRAWINGS

The accompanying drawings, which are incorporated in and form a part of the specification, illustrate an embodiment of the invention and, together with the description, serve to explain the principles of the invention.

FIG. 2 shows a two dimensional representation of a Latin square three dimensional gage master.

DETAILED DESCRIPTION OF THE INVENTION

Figure 1:
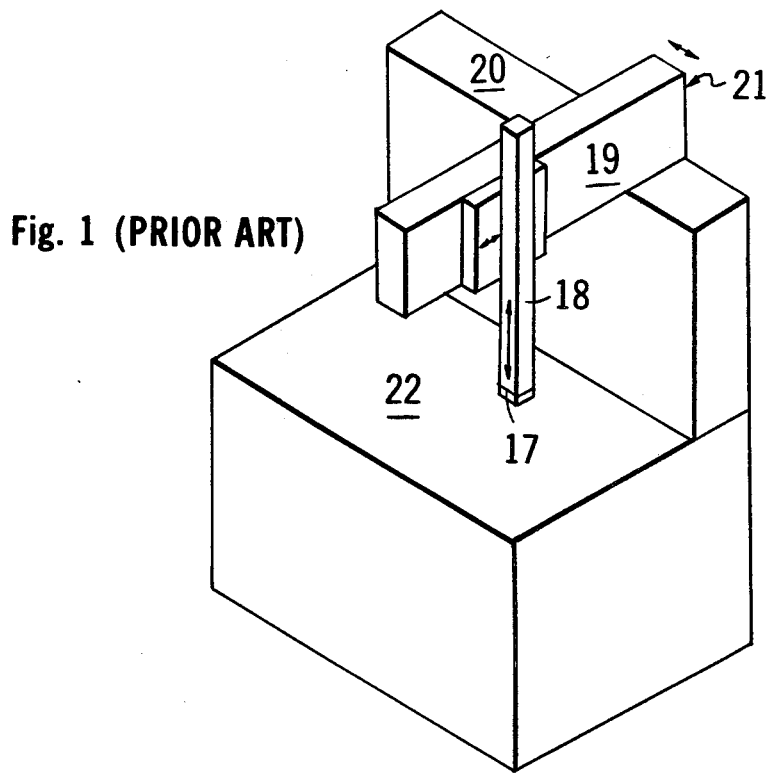
FIG. 1 shows schematically a cantilever CMM, a type of prior art device which may be used with this invention.

In accordance with the invention, a Latin square three dimensional gage master (LS3DGM) has been developed to obtain data that are analyzed using the Analysis of Variance (AOV) Technique to determine the measurement capability and to identify the source(s) of error in machine geometry in a CMM. The analysis technique is simple and straightforward and can be performed using a scientific hand calculator in about one hour by an individual with no background in statistics. (The AOV computational procedure can also be programmed into the microprocessor interfaced with a CMM.) This invention can be used with any CMM whose working space will accommodate its configuration.

There are 21 sources of error in CMM geometry that introduce inaccuracy into the measurement process, thereby increasing the probability of misclassifying a part being measured. (Misclassification means to classify a defective part as good or reject a good part as defective.) These sources of error are yaw, pitch and roll in each axis, out of squareness (XY, XZ and YZ), point to point in each axis and straightness in each axis (both horizontal and vertical). Each source of error produces a unique pattern (systematic bias) in terms of (1) which deviation(s) from nominal are affected, (2) which axis movement effects the deviation and (3) the form of the effect of axis movement. The source of error can be identified by proper interpretation of the Latin square analysis of variance because balanced data from an experimental design (Latin square) provide quantitative estimation of the systematic bias in both magnitude and form (linear, quadratic and cubic). Rapid identification of the source of error reduces machine downtime for adjustments and thus increases productivity. Proper adjustment of the machine will reduce inaccuracy, thereby reducing the probability of misclassifying a part.

Statistically balanced data is the most efficient means of obtaining information about a system. Prior devices for evaluating CMMs in three dimensions cannot adequately determine simultaneously in XYZ space deviations from nominal values that are balanced and that can be analyzed using simple statistical techniques. This inadequacy is caused by the necessity of moving each other devices in order to obtain balanced data, this movement introducing an additional source of variability into the measurement process.

The gage master of the invention overcomes this inadequacy by utilizing the concept of a Latin square experimental design in a single construction. (Another advantage of the single construction is that this device can reduce the time required to determine CMM accuracy over some conventional methods.) A Latin square of side n, or an nxn Latin square, may be illustrated by arrangement of n letters, each repeated n times, in such a manner that each letter appears once and only once in each row and column. A two dimensional representation of a Latin square (n=4) is shown in FIG. 2. For a gage master in accordance with the invention, each letter represents one of the n levels in the Z direction in which a point in space is defined.

Data obtained from a Latin square experimental design are balanced statistically and therefore can be analyzed using the analysis of variance technique. Balance means that each axis distance of each axis occurs once and only once at each axis distance of all remaining axes.

A preferred embodiment of the invention (FIG. 3) has an 18×18 inch Meehanite bench plate 22 having machined surface 23 for defining an XY plane. A 4×4 array of points in space is defined by the center of each of 16 substantially identical ⅜ inch diameter tungsten carbide balls, grade five, where the uniformity between balls for diameter and sphericity measures within 10 microinches. Each ball is commercially available from Industrial Tectonics Inc. with a shoulder 24 and shank 25 for press fit into a hole on a surface. Four balls are mounted directly to the surface 23 at locations 2, 5, 1 and 16; four balls are mounted atop 3-inch truncated cones 26 at locations 4, 7, 9 and 14; four balls are mounted atop 6-inch truncated cones 27 at locations 3, 8, 10 and 13; four balls are mounted atop 9-inch truncated cones 28 at locations 1, 6, 12 and 15. Each truncated cone has a hollow interior portion 29 to reduce weight and increase stability. Carrying handles 30 are provided at each end of the bench plate 22.

In use, the probe of a CMM contacts the contour of each tooling ball and, in a conventional manner well known in the CMM field, provides an output indication of the point in space occupied by the center of the ball. Precision objects other than tooling balls could also be used if the CMM were programmed to determine a point in space from their contours. Hollow rings are devices which the literature indicates have also been used to determine points in space with CMMs.

A CMM defines the points in space of the LS3DGM in terms of their positions in a rectangular Cartesian coordinate system. For convenience, one of the points in space at a corner of the device may be designated coordinate $X_0, Y_0, Z_0$.

Figure 3:
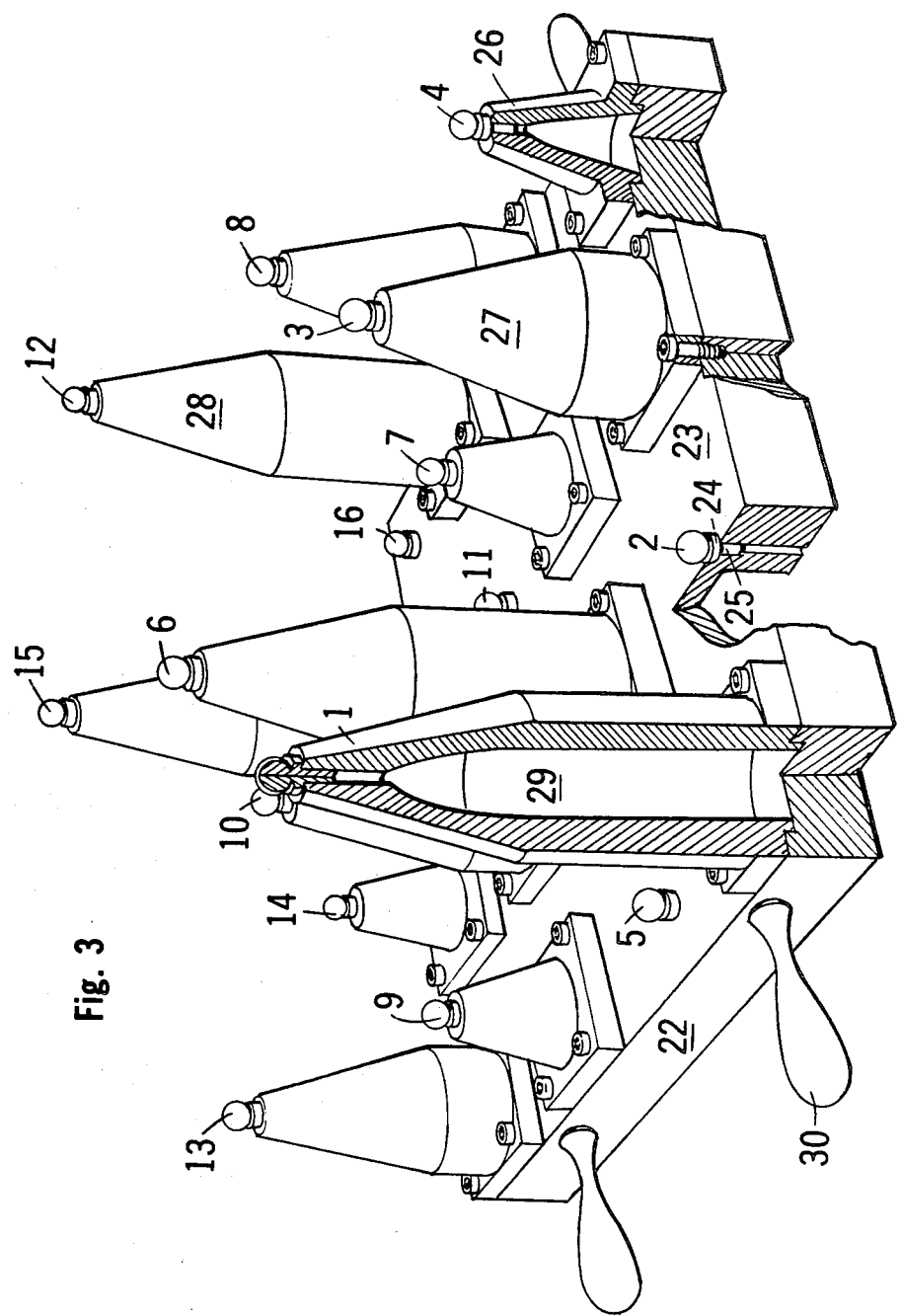
FIG. 3 is a partial cut-away of a preferred embodiment of this invention.

In the preferred embodiment of FIG. 3, the balls are arranged to provide even weight distribution to each quadrant of the plate while maintaining Latin square arrangement:

$X_0, Y_{3A}, Z_{2C}; X_A, Y_{3A}, Z_C; X_{2A}, Y_{3A}, Z_{3C}; X_{3A}, Y_{3A}, Z_0$
$X_0, Y_{2A}, Z_C; X_A, Y_{2A}, Z_{2C}; X_{2A}, Y_{2A}, Z_0; X_{3A}, Y_{2A}, Z_{3C}$
$X_0, Y_A, Z_0; X_A, Y_A, Z_{3C}; X_{2A}, Y_A, Z_C; X_{3A}, Y_A, Z_{2C}$
$X_0, Y_0, Z_{3C}; X_A, Y_0, Z_0; X_{2A}, Y_0, Z_{2C}; X_{3A}, Y_0, Z_C$ where unit of distance in X direction = unit of distance in Y direction = A = 5 inches, and unit of distance in Z direction = C = 3 inches. It is readily apparent that the mirror image or any rotation of this arrangement maintains the distribution of the preferred embodiment.

The invention is not limited to the configuration of FIG. 3. Any n×n array of points in space (n ≧ 3) having a Latin square distribution of Z coordinates is an LS3DGM, including arrangements where the unit of distance in the X direction (A) does not equal the unit of distance in the Y direction (B).

The calculations based on the analysis of variance technique are what make the LS3DGM a uniquely useful CMM gage master. The analysis of variance is an arithmetic technique for segregating the sources of variability affecting a set of observations. Its application to the invention is illustrated below.

The LS3DGM must be calibrated before it can be used. Calibration may be accomplished by measuring the gage master on a CMM which is known to be true or using a laser interferometer mounted on each axis or other known techniques. After calibration, the device is placed on the table of a CMM to be tested, a cone (location) is selected as the reference point, and the machine is initialized at this location. (The ball at this location becomes the reference ball.) The probe is then moved from ball to ball in sequence (1, 2, 3, ... 15, 16). At each ball location, X, Y, and Z observed values are obtained automatically. (In most machines the nominal values are read into the CMM computer so that deviations from nominal can be obtained automatically.) Table I illustrates typical calibration coordinates for an LS3DGM, observed coordinates from that LS3DGM by a CMM under test, and the error in the machine at each point (calculated by subtracting the calibration value from the measured value).

The data are then analyzed as set forth below to determine the capability of the CMM under test, the straightforward calculations being easily programmed into the microprocessor of the CMM if desired.

The following notations are used in this analysis:

| | | |
|---|---|---|
| $\sigma^2_{XDEV}$ | = | The quantitative measure of variation of deviations from X nominal. |
| $\sigma^2_{YDEV}$ | = | The quantitative measure of variation of deviations from Y nominal. |
| $\sigma^2_{ZDEV}$ | = | The quantitative measure of variation of deviations from Z nominal. |
| $\sigma^2_R$ | = | The quantitative measure of inherent random variation in the measuring process, determined by both repeated observations and/or residual interaction. |
| $\sigma^2_X$ | = | The quantitative measure of variation (random and/or systematic) in deviations from nominal due to moving the probe along the X axis. |
| $\sigma^2_Y$ | = | The quantitative measure of variation (random and/or systematic) in deviations from nominal due to moving the probe along the Y axis. |
| $\sigma^2_Z$ | = | The quantitative measure of variation (random and/or systematic) in deviations from nominal due to moving the probe along the Z axis. |
| $\sigma^2_{CMM}$ | = | The quantitative measure of accuracy of a coordinate measuring machine. |

As set forth herein, the analysis will estimate precision and accuracy of the CMM being evaluated. For this analysis:

| | | |
|---|---|---|
| $\hat{\sigma}^2_{CMMR\ (precision)}$ | = | $\hat{\sigma}^2_{RX} + \hat{\sigma}^2_{RY} + \hat{\sigma}^2_{RZ}$ |
| $\hat{\sigma}^2_{CMM\ (accuracy)}$ | = | $\hat{\sigma}^2_{XDEV} + \hat{\sigma}^2_{YDEV} + \hat{\sigma}^2_{ZDEV}$, where |
| $\hat{\sigma}^2_{XDEV}$ | = | $\hat{\sigma}^2_X + \hat{\sigma}^2_Y + \hat{\sigma}^2_Z + \hat{\sigma}^2_{RX}$ |
| $\hat{\sigma}^2_{YDEV}$ | = | $\hat{\sigma}^2_X + \hat{\sigma}^2_Y + \hat{\sigma}^2_Z + \hat{\sigma}^2_{RY}$ |
| $\hat{\sigma}^2_{ZDEV}$ | = | $\hat{\sigma}^2_X + \hat{\sigma}^2_Y + \hat{\sigma}^2_Z + \hat{\sigma}^2_{RZ}$. |

The symbol ˆ denotes a value estimated using the observed data.

The estimates of these unknowns are determined directly from the analysis of variance (AOV) table. A generalized AOV table is presented in Table II for a 4×4 Latin square. The computation procedure for data from the LS3DGM is presented in Table III for deviation from X nominal. The AOV table for deviations from X nominal for the CMM under test is shown in Table IV, after being calculated from the data of Table III. The estimate used to determine machine capabilities is determined by simple algebra as indicated using the Mean Square column and the Expected Mean Square column. For example, as shown in Table IV, the estimate of precision in determining deviation from X nominal is $$\hat{\sigma}^2_{RX} = 1250 \text{ microinches.}^2$$

The estimate of the component due to movement along the Z axis is $$\hat{\sigma}^2_Z = \frac{Z_{MS} - E_{MS}}{4}.$$

If this value is negative, $\sigma_Z^2$ is set to zero. Similarly, $$\hat{\sigma}^2_Y = \frac{Y_{MS} - E_{MS}}{4}, \text{ and } \hat{\sigma}^2_X = \frac{X_{MS} - E_{MS}}{4}.$$

The analysis of deviations from Y nominal (Table V) and deviations from Z nominal (Table VI) are similar to those shown for deviations from X nominal. The deviations from X nominal in Table III are replaced by the appropriate set of deviations from Y nominal and Z nominal, respectively. The results from the AOVs are used to determine measurement capability of the CMM. (As previously indicated, these analyses can be programmed into the microcomputer that is interfaced with the CMM with about 300–400 programming steps. Calculations of analysis could begin as soon as the first data point is taken and the complete analysis finished almost as soon as the last data point is taken. Otherwise, about one hour is required using a non-programmable scientific hand calculator.)

Precision is defined as $\pm 2\hat{\sigma}_{CMMR}$, where $$\hat{\sigma}_{CMMR} = \sqrt{\sigma_{XR}^2 + \sigma_{YR}^2 + \sigma_{ZR}^2}.$$

In this example, $\hat{\sigma}_{CMMR} = \sqrt{1250 + 1467 + 2490} = \sqrt{5207} = 72\mu$ inches $= 0.000072$ inches. Therefore, for the CMM under test, precision $= \pm 0.000144$ inches.

Machine accuracy (or machine tolerance) is defined to be $\pm 2\sigma_{CMM}$, where $$\sigma_{CMM} = \sqrt{\sigma_{XDEV}^2 + \sigma_{YDEV}^2 + \sigma_{ZDEV}^2}$$

For the data in this example, $\hat{\sigma}_{CMM} = \sqrt{1604 + 1999 + 3190} = \sqrt{6793} = 82\mu$ inches $= 0.000082$ inches. Therefore, for the CMM under test, accuracy or machine tolerance $= \pm 0.000164$ inches. The above results are summarized in Table VII.

This information may be used to determine if the machine has the capability of correctly classifying parts submitted to be inspected. Parts whose "specifications" or tolerance requirements are less than or close to the machine tolerance cannot be adequately inspected by using the machine; if they are, misclassification may occur. For example, assuming the diameter of a critical part to have a tolerance requirement of $\pm 0.000164$ inches, and CMM an accuracy (or tolerance) of $\pm 0.000164$ inches, if the variation in the process is such that the process is making five percent defective parts, then 14 percent of the parts will be misclassified because of the magnitude of machine inaccuracy. If the CMM was then adjusted and its accuracy determined to be $\pm 0.000041$ inches, the misclassification error rate would be only two percent. Therefore, knowledge of the measurement accuracy of a CMM can be used to determine if the CMM is capable of correctly measuring inspection items.

The Latin square AOV has another important use in evaluating CMM. If a CMM is out of calibration or exhibits excessive inherent variations, it is desirable to make the necessary adjustments to bring the CMM back into calibration (i.e., reduce its inaccuracy). Currently the approach is based on experience and trial and error. An advantage of the LS3DGM is that the analysis of variance from which quantitative estimates of the factors affecting machine measurement capabilities are obtained can also be used to identify sources of error in CMM geometry. The type of error (yaw, pitch, roll in X/Y/Z, point-to-point positioning (in X/Y/Z) and out of squareness (XY, XZ and YX)) can be identified by proper interpretation of the Latin square analysis of variance. This technique is discussed in detail in report BID-A133, "Use of Latin Square Analysis of Variance to Identify Sources of Error in Cantilever Design Coordinate Measuring Machines," which will be available from the National Technical Information Service in 1981. As the report shows, each source of error produces a unique pattern (systematic bias) in terms of which deviations from nominal are affected, which axis affects the deviation and the form that the effect of axis movement has on the deviation. An advantage of the LS3DGM is that the balanced data from the Latin square design provides quantitative determinations of the systematic bias both in magnitude and form. For example, yaw in the X axis is identified by linear and cubic effects on X deviations from nominal when movement along the X axis is present and movement along the X axis causes a small quadratic effect on deviations from Y nominal. Naturally, once a source of error in a CMM is identified it may be either corrected or taken into account.

It has been shown that an LS3DGM may be used to greatly simplify the use and increase the reliability of CMMs. With this invention the errors in a CMM may be determined and corrected with less machine downtime. In addition, accuracy of the CMM may be determined and compared with the device to be measured. LS3DGM is a relatively simple mechanical device to build and requires relatively simple arithmetic and statistics to use.

The particular size and configuration of LS3DGM discussed above are cited merely to illustrate a particular embodiment of the invention. It is intended that the scope of the invention be defined by the claims appended hereto.

TABLE I

Data to Demonstrate Analysis Technique for Data from LS3DGM

| Pt | Axis | Calibrated Values | Observed Values | Error In $\mu$Inches |
|---|---|---|---|---|
| 1 | X | 0.000000 | 0.000000 | 0 |
|   | Y | 0.000000 | 0.000000 | 0 |
|   | Z | 0.000000 | 0.000000 | 0 |
| 2 | X | 4.999490 | 4.999500 | 10 |
|   | Y | 0.001590 | 0.001590 | 0 |
|   | Z | −9.000310 | −9.000310 | 0 |
| 3 | X | 10.000910 | 10.000920 | 10 |
|   | Y | −0.000450 | −0.000490 | −40 |
|   | Z | −2.999960 | −2.999960 | 0 |
| 4 | X | 15.000750 | 15.000770 | 20 |
|   | Y | 0.000020 | −0.000020 | −40 |
|   | Z | −6.001260 | −6.001300 | −40 |
| 5 | X | 0.000200 | 0.000220 | 20 |
|   | Y | 5.002580 | 5.002580 | 0 |
|   | Z | −8.999640 | −8.999640 | 0 |
| 6 | X | 5.000510 | 5.000450 | −60 |
|   | Y | 5.000690 | 5.000650 | −40 |
|   | Z | 0.000710 | 0.000750 | 40 |
| 7 | X | 10.003230 | 10.003210 | −20 |
|   | Y | 4.998210 | 4.998170 | −40 |
|   | Z | 5.998780 | 5.998820 | −40 |
| 8 | X | 15.001730 | 15.001750 | 20 |
|   | Y | 5.000260 | 5.000180 | −80 |
|   | Z | −2.999800 | −2.999800 | 0 |
| 9 | X | 0.000470 | 0.000490 | 20 |
|   | Y | 10.002890 | 10.002890 | 0 |
|   | Z | −5.999370 | −5.999450 | −80 |
| 10 | X | 5.001930 | 5.001990 | 60 |
|   | Y | 10.001950 | 10.001910 | −40 |
|   | Z | −2.998460 | −2.998580 | −120 |
| 11 | X | 10.001180 | 10.001200 | 20 |
|   | Y | 9.999860 | 9.999940 | 80 |
|   | Z | −8.998270 | −8.998350 | 80 |
| 12 | X | 15.003230 | 15.003330 | 100 |
|   | Y | 10.000570 | 10.000570 | 0 |
|   | Z | 0.000040 | 0.000000 | −40 |
| 13 | X | 0.001140 | 0.001160 | 20 |
|   | Y | 15.003010 | 15.002970 | −40 |
|   | Z | −2.999210 | −2.999290 | −80 |
| 14 | X | 5.000590 | 5.000650 | 60 |
|   | Y | 15.002970 | 15.003010 | 40 |
|   | Z | −6.000630 | −6.000710 | −80 |
| 15 | X | 10.000670 | 10.000690 | 20 |
|   | Y | 15.005610 | 15.005650 | 40 |
|   | Z | 0.000040 | 0.000000 | −40 |
| 16 | X | 15.000750 | 15.000770 | 20 |
|   | Y | 15.000020 | 14.999940 | −80 |
|   | Z | −9.000830 | −9.000940 | −110 |

TABLE II

Generalized Analysis of Variable Table for 4 × 4 Latin Square with No Repeated Runs

| Source of Variation | Degrees of Freedom | Sum of Squares | Mean Square | Expected Mean Square |
|---|---|---|---|---|
| Total | 15 | Tss | | |
| X | 3 | Xss | Xms = Xss/3 | $\sigma_R^2 + 4\sigma_X^2$ |
| Y | 3 | Yss | Yms = Yss/3 | $\sigma_R^2 + 4\sigma_Y^2$ |
| Z | 3 | Zss | Zms = Zss/3 | $\sigma_R^2 + 4\sigma_Z^2$ |
| Error (Residual) | 6 | Ess | Ems = Ess/6 | $\sigma_R^2$ |

TABLE III

Computational Technique to Compute Sum of Squares for a 4 × 4 Latin Square $$C = (\text{Sum of Xdev})^2/16 =$$
$$((0)+(10)+(10)+\ldots+(20))^2/16 = 6400$$

$$\text{Tss} = \text{Sum of (Xdev)}^2 - C =$$
$$((0)^2+(10)+\ldots+(20)^2)-6400 = 18200$$

$$\text{Xss} = \frac{X_1^2+X_2^2+X_3^2+X_4^2}{4} - C =$$

$$\frac{(60)^2+(70)^2+(30)^2+(160)^2}{4} - C = 8750 - 6400 = 2350$$

$$\text{Yss} = \frac{Y_1^2+Y_2^2+Y_3^2+Y_4^2}{4} - C =$$

$$\frac{(40)^2+(-40)^2+(200)^2+(120)^2}{4} - C = 14400 - 6900 = 8000$$

$$\text{Zss} = \frac{Z_1^2+Z_2^2+Z_3^2+Z_4^2}{4} - C =$$

$$\frac{(60)^2+(110)^2+(80)^2+(70)^2}{4} - C = 6750 - 6400 = 350$$

Ess = Tss − Xss − Yss − Zss = 18200 − 2350 − 8000 − 350 = 7500

Where:
$X_1$ = Sum of all deviation from X Nominal at X = 0
  $X_1 = 0 + 20 + 20 + 20 = 60$
$X_2$ = Sum of all deviation from X Nominal at X = 5
  $X_2 = 10 + (-60) + 60 + 60 = 70$
  $X_3 = 10 + (-20) + 20 + 20 = 30$
  $X_4 = 20 + 20 + 100 + 20 = 160$
$Y_1$ = Sum of all deviation from X Nominal at Y = 0
  $Y_1 = 0 + 10 + 10 + 20 = 40$
  $Y_2 = 20 + (-60) + (-20) + 20 = (-40)$
  $Y_3 = 20 + 60 + 20 + 100 = 200$
  $Y_4 = 20 + 60 + 20 + 20 = 120$
$Z_1$ = Sum of all deviation from X Nominal at Z = 9" cone
  $Z_1 = 0 + (-60) + 20 + 100 = 60$
  $Z_2 = 10 + 20 + 60 + 20 = 110$
  $Z_3 = 20 + (-20) + 20 + 60 + 80$
  $Z_4 = 10 + 20 + 20 + 20 = 70$

TABLE IV

Deviation from X Nominal (Data in μinches²)

| Source of Variation | Degrees of Freedom | Sum of Squares | Mean Square | Expected Mean Square |
|---|---|---|---|---|
| Total | 15 | 18200 | | |
| X | 3 | 2350 | 783 | $\sigma_{RX}^2 + 4\sigma_X^2$ |
| Y | 3 | 8000 | 2667 | $\sigma_{RX}^2 + 4\sigma_Y^2$ |
| Z | 3 | 350 | 117 | $\sigma_{RX}^2 + 4\sigma_Z^2$ |
| Error (Residual) | 6 | 7500 | 1250 | $\sigma_{RX}^2$ |

Component Estimation $\hat{\sigma}_{RX}^2 = 1250$

TABLE IV-continued

Deviation from X Nominal (Data in μinches²)

$\hat{\sigma}_Z^2 = 0$ $\hat{\sigma}_Y^2 = 354$ $\hat{\sigma}_X^2 = 0$ $\hat{\sigma}_{XDEV}^2 = 1604$

TABLE V

Deviation from Y Nominal (Data in μinches²)

| Source of Variation | Degrees of Freedom | Sum of Squares | Mean Square | Expected Mean Square |
|---|---|---|---|---|
| Total | 15 | 28400 | | |
| X | 3 | 7600 | 2533 | $\sigma_{RY}^2 + 4\sigma_X^2$ |
| Y | 3 | 5200 | 1733 | $\sigma_{RY}^2 + 4\sigma_Y^2$ |
| Z | 3 | 6800 | 2267 | $\sigma_{RY}^2 + 4\sigma_Z^2$ |
| Error (Residual) | 6 | 8800 | 1467 | $\sigma_{RY}^2$ |

Component Estimation $\hat{\sigma}_{RY}^2 = 1467$ $\hat{\sigma}_Z^2 = 200$ $\hat{\sigma}_Y^2 = 66$ $\hat{\sigma}_Z^2 = 266$ $\hat{\sigma}_{YDEV}^2 = 1999$

TABLE VI

Deviation from Z Nominal (Data in μ inches²)

| Source of Variation | Degrees of Freedom | Sum of Squares | Mean Square | Expected Mean Square |
|---|---|---|---|---|
| Total | 15 | 43844 | | |
| X | 3 | 14569 | 4856 | $\sigma_{RZ}^2 + 4\sigma_X^2$ |
| Y | 3 | 5569 | 1856 | $\sigma_{RZ}^2 + 4\sigma_Y^2$ |
| Z | 3 | 8769 | 2923 | $\sigma_{RZ}^2 + 4\sigma_Z^2$ |
| Error (Residual) | 6 | 14937 | 2490 | $\sigma_{RZ}^2$ |

Component Estimation $\hat{\sigma}_{RZ}^2 = 2490$ $\hat{\sigma}_Z^2 = 108$ $\hat{\sigma}_Y^2 = 0$ $\hat{\sigma}_X^2 = 592$ $\hat{\sigma}_{ZDEV}^2 = 3190$

TABLE VII

Estimates of CMM Capability

| | | | | |
|---|---|---|---|---|
| Precision | = | $\pm 2\hat{\sigma}_{CMMR}$ | = | ±0.000144 inches |
| Accuracy | = | $\pm 2\hat{\sigma}_{CMM}^2$ | = | ±0.000164 inches |

We claim:
1. A gage master for coordinate measuring machines comprising:
  a. n² substantially identical object means for defining a point in space, where n is an integer ≧3;

b. mounting means for rigidly fastening each object means relative to the other object means to define $n^2$ points in space, the points being located relative to the coordinate $X_0$, $Y_0$, $Z_0$ at coordinates $X_{iA}$, $Y_{jB}$, $Z_{kC}$ where A = unit of distance in the X direction, B = unit of distance in the Y direction, C = unit of distance in the Z direction, $i = (0, 1, 2, \ldots, n-1)$, $j = (0, 1, 2, \ldots, n-1)$, and for each column $X_{iA}$ and each row $Y_{jB}$, k equals each number of the set $(0, 1, 2, \ldots, n-1)$, forming an $n \times n$ Latin square.

2. The gage master of claim 1 wherein said mounting means comprises: a bench plate having a lower surface for resting on the bed of a coordinate measuring machine and an upper surface defining an X, Y plane; and a plurality of means supporting said object means above said bench plate.

3. The gage master of claim 2 wherein each means for supporting comprises a truncated cone having a base affixed to said bench plate and a truncated surface affixed to an object means.

4. The gage master of claim 3 wherein the n object means having coordinates X, Y, $Z_0$ are each fastened directly to said bench plate and the $n(n-1)$ remaining object means are each fastened to said bench plate by one of said truncated cones, the Z coordinate for each said object means being determined by the length of the cone to which it is fastened.

5. The gage master of claim 1 or 4 wherein each of said object means comprises a tooling ball.

6. The gage master of claim 1 or 4 wherein $A = B$.

7. The gage master of claim 1 or 4 wherein $n = 4$.

8. The gage master of claim 1 or 4 wherein $A = B$; $n = 4$; and the object means are arranged at the following coordinates:

$X_0$, $Y_0$, $Z_{3C}$; $X_A$, $Y_0$, $Z_0$; $X_{2A}$, $Y_0$, $Z_{2C}$; $X_{3A}$, $Y_0$, $Z_C$ $X_0$, $Y_A$, $Z_0$, $X_A$, $Y_A$, $Z_{3C}$; $X_{2A}$, $Y_A$, $Z_C$; $X_{3A}$, $Y_A$, $Z_{2C}$ $X_0$, $Y_{2A}$, $Z_C$; $X_A$, $Y_{2A}$, $Z_{2C}$; $X_{2A}$, $Y_{2A}$, $Z_0$; $X_{3A}$, $Y_{2A}$, $Z_{3C}$ $X_0$, $Y_{3A}$, $Z_{2C}$; $X_A$, $Y_{3A}$, $Z_C$; $X_{2A}$, $Y_{3A}$, $Z_{3C}$; $X_{3A}$, $Y_{3A}$, $Z_0$.

* * * * *